Oct. 24, 1950  W. A. BIERMANN ET AL  2,526,992
THERMOSTATIC SWITCH
Filed Feb. 8, 1946  4 Sheets-Sheet 1
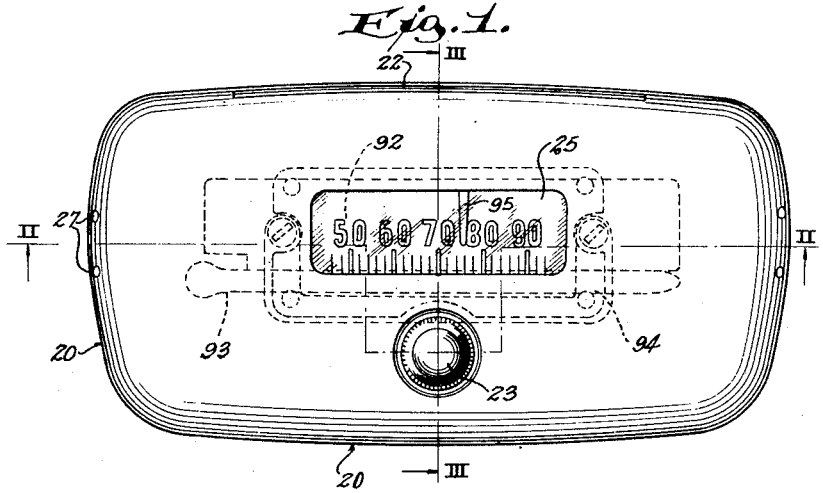
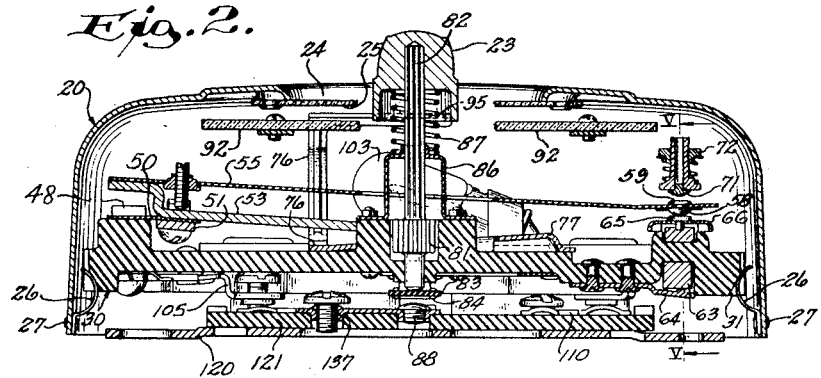
INVENTORS.
WILLIAM A. BIERMANN
EDWARD R. RACK.
BY
John W. Michael
ATTORNEY.

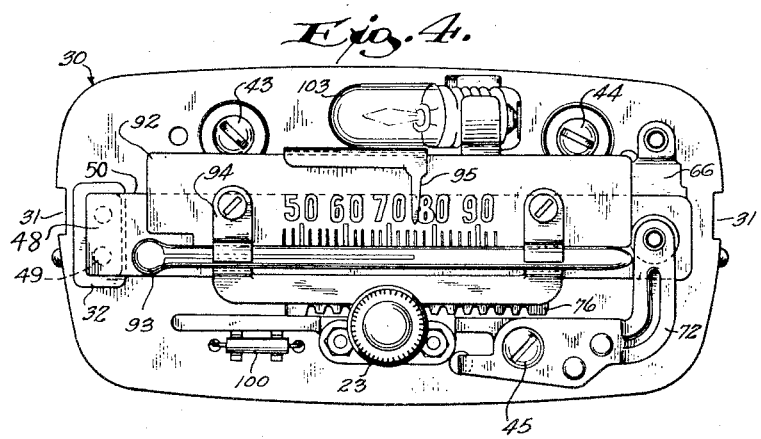
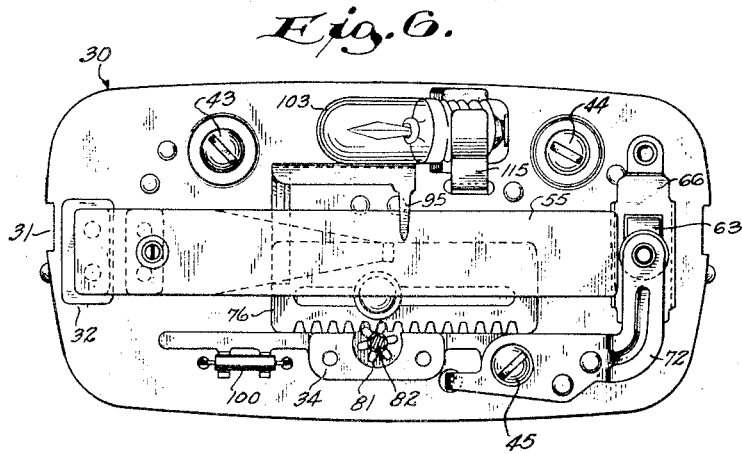
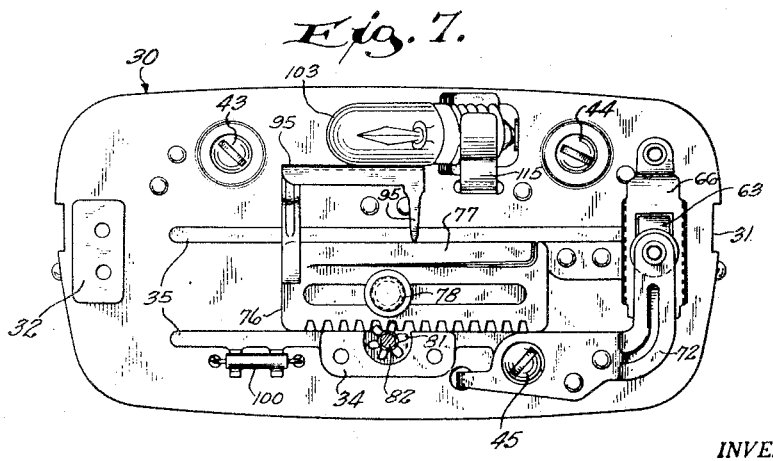

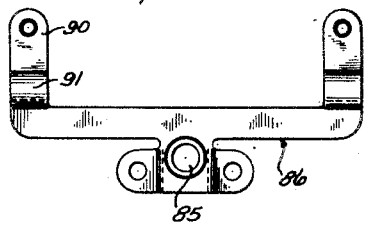
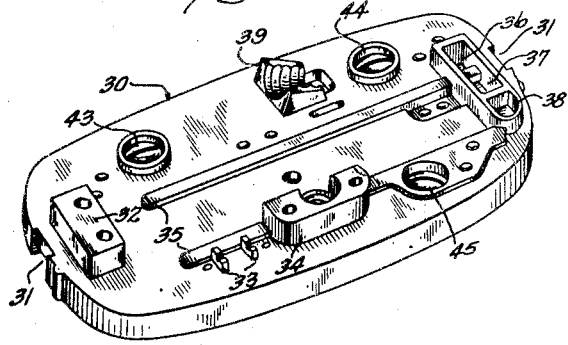
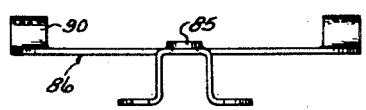
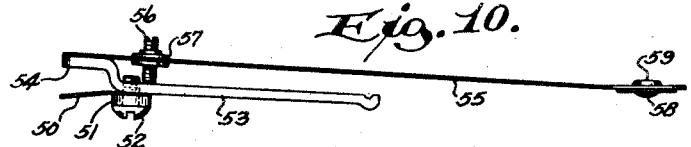
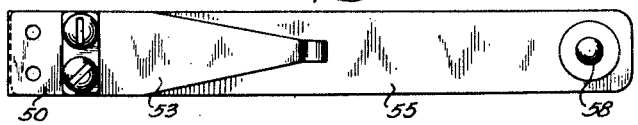
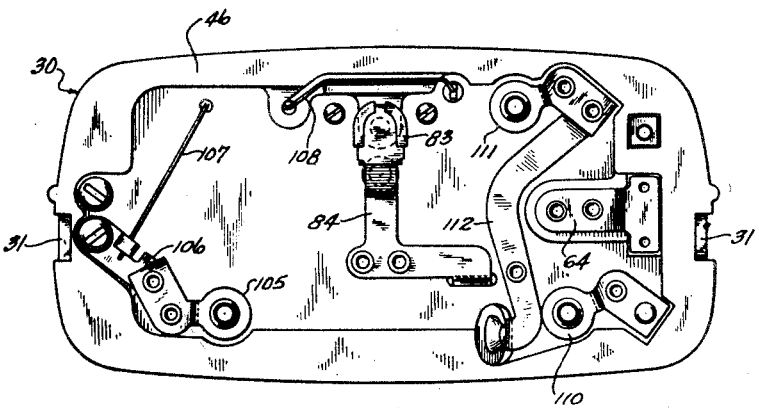
INVENTORS.
WILLIAM A. BIERMANN
EDWARD R. RACK
BY John W. Michael
ATTORNEY.

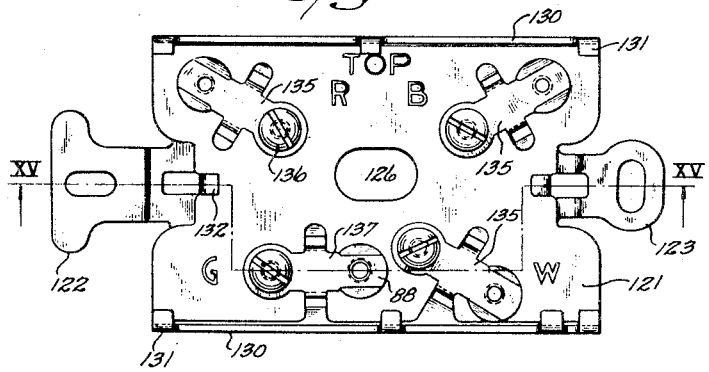
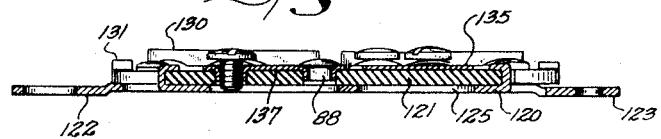
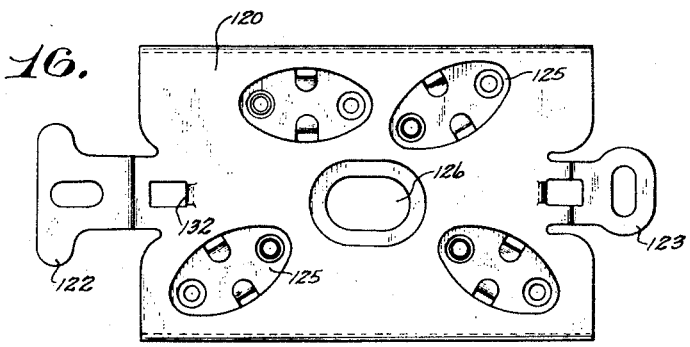
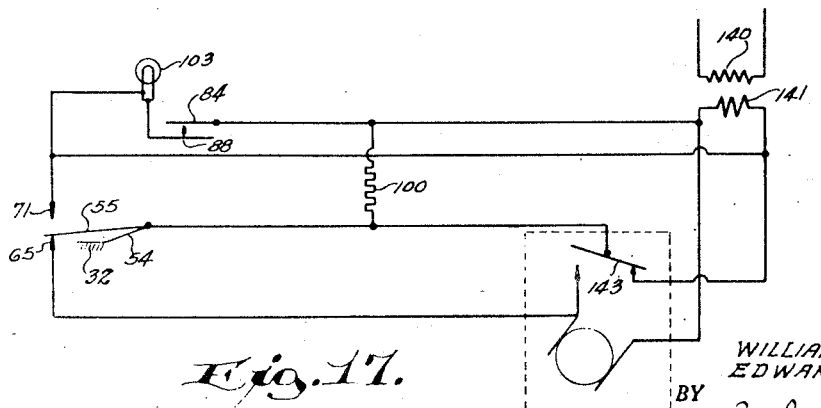

Patented Oct. 24, 1950

2,526,992

UNITED STATES PATENT OFFICE 2,526,992

THERMOSTATIC SWITCH

William A. Biermann and Edward R. Rack, Milwaukee, Wis., assignors to Automatic Products Company, Milwaukee, Wis., a corporation of Wisconsin Application February 8, 1946, Serial No. 646,362

5 Claims. (Cl. 200—139)

This invention relates to improvements in thermally responsive switches and particularly to thermostats which are to be adjustable for operation at any desired temperature within a wide range.

One object of the invention is to provide a thermostat which will be positively responsive to a wide range of ambient temperatures with substantially equal sensitivity over the the entire range.

Another object of the invention is to provide an adjustable thermostat in which the several adjustments are readily calibrated and remain accurate over the entire range of adjustment and throughout the entire life of the thermostat.

Another object of the invention is to provide a thermostat with means for manually adjusting a flexible thermally responsive sub-assembly and acting directly thereon in the direction of flexure of such sub-assembly in operation.

A further object of the invention is to provide a thermostat in which rotary movement of a manual adjusting means is converted into rectilinear motion which permits use of a straight line scale on which such movement is indicated, thereby increasing the accuracy and readability of such adjustment.

A further object of the invention is to provide a thermostat divided into a plurality of sub-assemblies which may be severally constructed and tested prior to combination into a complete unit, and in which the several sub-assemblies are securely but releasably held together under spring tension.

Another object of the invention is to provide a thermostat in which the parts are severally simplified in construction and in which at least some of the parts are required to perform a multiplicity of functions.

Another object of the invention is to provide a thermostat incorporating a light which is lighted by the manually operated means adjusting the thermally responsive means and which is lighted only during the time the thermostat is being adjusted, such light bulb being used to illuminate the temperature-indicating means and the adjustment-indicating scale and pointer.

And a further object of the invention is to provide a thermostat which presents the minimum of projections from the exterior surface of the casing, in which the adjustment of the device is readily accomplished, in which the temperature-indicating means and the scale co-acting with such indicating means are inclosed but are readily visible from exteriorly of the device, and in which the device is materially simplified and hence is more readily and cheaply manufactured, more easily serviced, and more durable in use than prior devices.

Objects and advantages other than those above set forth will be apparent from the following description when read in connection with the accompanying drawings, in which:

Fig. 1 is an elevation of the completed device;

Fig. 2 is a section on the plane of the broken line II—II of Fig. 1;

Fig. 3 is a section on the plane of the line III—III of Fig. 1;

Fig. 4 is an elevation with the cover removed;

Fig. 5 is a section taken on the plane of the line V—V of Fig. 2 and with cover and base or terminal board omitted;

Fig. 6 is a view similar to Fig. 4 but with the indicating means, the scale, and the support therefor also removed;

Fig. 7 is a view similar to Fig. 6 but with the thermally responsive means also removed;

Fig. 8 is a top plan view of a scale and indicator support bracket;

Fig. 9 is a side view of the bracket shown in Fig. 8;

Fig. 10 is a side view of the thermally responsive sub-assembly;

Fig. 11 is a plan view of the thermally responsive sub-assembly;

Fig. 12 is a perspective view showing particularly the side of a panel on which the movable operating mechanism of the thermostat is mounted;

Fig. 13 is a plan view of the reverse side of the mounting panel;

Fig. 14 is a plan view of one side of the base or terminal board;

Fig. 15 is a section taken on the plane of the line XV—XV of Fig. 14;

Fig. 16 is a plan view of the reverse side of the base and terminal board; and

Fig. 17 is a diagram of the electrical connections within the thermostat and to an electric motor controlled thereby.

Generally, the device comprises a cover substantially inclosing all of the other portions of the structure and provided with apertures for the circulation of air about the operating mechanism, for the extension therethrough of a combined adjusting knob and switch and for the observation of temperature-indicating means and a pointer indicating the adjustment of the device. A panel inclosed by the cover serves as a mounting on which are supported various means including the indicating means with a scale utilized both by such means and by the pointer showing the adjustment of the thermostat, the thermally responsive means and the electrical contacts closed or brought into engagement thereby, and the means for adjustably controlling the closing position of the thermally responsive means. A base or terminal board is retained within the cover and is releasably associated with the mounting panel and serves the purpose of mounting the completed device on a wall or other surface as well as providing the support for the electrical terminals of the circuit to be controlled by the device and coacts with the mounting panel in inclosing the connections from such terminals to the several current conducting portions of the device.

Referring particularly to the drawings by reference numerals, the numeral 20 designates a casing or cover which is preferably a relatively light metal shell having openings 21, 22 therethrough for the circulation of air about the operating mechanism within the cover, an opening through which an adjusting knob 23 protrudes, and an opening 24 closed by a transparency 25 and serving as a window for the observation of temperature-indicating means, a pointer associated with adjusting mechanism, and a scale coacting with the indicating means and the pointer. The cover has fastened in the ends thereof suitable (and well-known) resilient tongues 26, as by means of rivets 27, to engage with and be releasably retained in other portions of the structure to be described.

The mounting panel generally designated 30 (see Figs. 12 and 13) is preferably made of electrical insulating material of such size as to fit easily within the casing 20 and is formed with notches 31 in the ends thereof engaging with the resilient tongues 26 to provide for the secure retention on but ready removal of the cover from the panel. One surface of the panel is generally a plane surface but is provided with various bosses, openings and ribs to form seats, guides and sockets for the operating mechanism. A boss 32 provides a seat for the thermally responsive means or sub-assembly, bosses 33 provide seats for a heating element, boss 34 provides a seat on which the indicating-adjusting means is supported, ribs 35 form a guideway for movement of a portion of the adjusting means, sockets 36, 37 and 38 receive a fixed contact sub-assembly, and socket 39 receives an electric light bulb for illuminating the indicating and adjusting means. The panel is formed with a plurality of apertures in which are retained screws 43, 44, and 45, and with various other apertures, the purpose of which will appear hereinafter. The reverse side of the mounting panel is formed with a peripheral flange 46 defining a recess in which are mounted some of the supporting means for the operating mechanism elements and sub-assemblies and the electrical connections thereto.

The mounting panel boss 32 has seated and fixed thereon as by a clamping bar 48 and screws 49, a thermally responsive sub-assembly including a leaf spring hinge 50 fastened by a bar 51 and suitable screws on the major portion 53, and intermediate the ends, of a rigid arm or lever having an offset portion 54. A bimetallic element 55 is fixed on the lever offset 54 and extends in spaced relation over the major arm portion 53, the spacing being adjustable by a screw 56 threaded into a bushing 57 fixed in the bimetal and adjustably bearing on the arm portion 53. The free end of the bimetallic strip is provided with contacts 58 and 59 on the opposite sides of such strip. It will be seen that the bimetal is substantially a planar strip without bows or bends of material size therein and is therefore more readily made and calibrated than heretofore.

The bimetal contacts 58 and 59 are the movable contacts of a switch also having a plurality of aligned and fixed contacts respectively mounted adjacent to one surface of and arranged above the mounting panel. The panel sockets 36 and 37 are in reality flanged apertures to receive the two poles of a horseshoe type permanent magnet 63 held in place by a clamp 64. A fixed contact 65 (Fig. 5) is adjustably held between the poles of the magnet on a strip 66 of resilient metal cut out to expose the magnet pole faces at the sides of the fixed contact. The contact holder 66 is secured at one end on the mounting panel and is biased away from such panel by a spring 67 seated in the socket 38 and held under compression by a screw 68 extending through the panel and adjustable to allow positioining of the contact 65 within a given range of distances relative to the plane of the magnet pole faces. A second fixed contact 71 is adjustably mounted, in alignment with and spaced from the contact 65, on a bracket 72 secured on the mounting panel. Such contact is held in adjusted position by a spring 73 acting between a flange on the contact and the bracket. It will be seen that the movable contacts 58, 59 on the bimetal 55 engage respectively and alternately with the contacts 65 and 71 under conditions to be described.

The means for adjusting the bimetal 55 includes a rack 76 (Fig. 7) slidably guided by the ribs 35 and formed with a cam surface 77 engaged by the free end of the arm or lever portion 53. The rack is firmly but resiliently held in the guideway by a stud 78 secured in the mounting panel and extending through a slot in the rack to retain a compression spring 79 acting between a plate 80, sliding on the rack, and the head of the stud. A pinion 81 is formed as an integral part of a shaft 82 carrying the adjusting knob 23 and is positioned to engage the rack for sliding the rack laterally in its guideway.

The shaft has one end thereof projecting through the mounting panel and seating on an electrical insulating pad 83 of low friction material which is mounted on a resilient support 84, and the upper end of the shaft extends through an aperture 85 in a bracket generally designated 86 (see Figs. 8 and 9) and secured on the mounting panel boss 34. A spring 87 acts between the bracket 86 and the knob 23 to aid the support 84 in floatingly mounting the pinion 81 and the shaft 82. Such floating mounting also allows the shaft 82, which extends below the mounting panel, to be used as a movable means to depress the resilient support 84, which is an electrical conductor, against a fixed contact 88, thus completing the light circuit.

The bracket 86 is provided with arms 90 having semi-circular seats 91 formed therein. A translucent scale 92 is mounted on the bracket arms and a thermometer 93 is mounted in the arm seat portions 91, both the scale and the thermometer being held in position by clamps 94, thus in effect making the scale and thermometer a unitary sub-assembly readily calibrated and useful in calibrating other portions of the device. It will be seen in Fig. 3 that the scale 92 is mounted substantially parallel to and adjacent the window 25 and that the thermometer 93 is also visible by way of the window if the observer sights through the window at a slight angle. A pointer 95 is secured on the rack 76 and moves over the scale, upon movement of the rack, to indicate the temperature to be obtained at each change in the rack position and hence each adjustment of the bimetal. Because of the rectilinear movement of the rack and pointer, the entire scale 92 is visible at all times. The gear ratio between rack 76 and pinion 82 is such that one and one-half revolutions of the knob 23 are necessary to secure full adjustment of the thermostat and to traverse the pointer 95 entirely over the scale. Constant visibility of the entire scale and of the pointer position thereon and the increased movements required of the knob for full adjustment produces a more accurate adjustment of the thermostat than was possible heretofore.

An electric heating element 100 is seated in the bosses 33 to supply heat to the bimetal 55. An electric light bulb 103 is seated in the mounting panel socket 79 in position to transmit light through the scale 92 and to illuminate the thermometer 93 without, however, itself being visible through the window 25. The circuit to the light is controlled by knob 23 (as above described) which thus serves a dual purpose.

Referring now to Fig. 13 it will be seen that the thermally responsive means 50—59, inclusive, is connected to a terminal 105 by way of a connector 106. A connection 107 leads from the connector 106 to the heating element 100 and a connector 108 leads from such heating element to the bracket 72 and the contact 71. A second terminal 110 is electrically connected with the holder 65 for the fixed contact 65 and a third terminal 111 is connected electrically by way of a connector 112 with one terminal of the light bulb 103. Such bulb is held in the socket 39 by a spring clip 115 which forms the other terminal of the bulb. It will be seen that all of the connectors are within the recess in the panel 30 but the terminals 105, 110, and 111 are resilient and, when not under tension, extend beyond the edge of the panel flange 46.

Figs. 14, 15 and 16 show the base and terminal board which generally comprises a metal backing 120 holding a sheet of electrical insulating material 121. The metal backing is provided with lugs 122 and 123 with elongated slots by which the entire device may be mounted on a wall or other surface, such lugs being shaped and slotted, as is well known, to increase the resilience thereof and for other purposes. It will be seen that the backing 120 is provided with a plurality of apertures 125 and an aperture 126, for purposes which will appear hereinafter. Two edges of the backing are formed with flanges 130 formed with ears 131 which coact with ears 132 struck from the lugs 122 and 123, in securing the insulating plate 121 in position on the backing 120. Terminal plates 135 are clipped to the insulating plate and are provided with threaded openings in the ends thereof to receive screws 136 by which the various conductors of the circuit to be controlled are connected to the terminal plates and to receive the screws 43, 44, and 45 which serve to join the mounting panel and the base board mechanically and to connect the terminals 105, 110 and 111 electrically with the terminal plates 135. A terminal plate 137 provides the fixed contact 88 for the light switch previously described.

The conductors of the circuit to be controlled pass through the base opening 126 and all connections are made within the inclosed space defined by the mounting panel recess and the base insulating plate 121. The terminal plate ears and the terminal screws pass through the insulating plate 121 and extend into the apertures 125 in the metal base backing 120 in spaced and hence in insulated relation.

Fig. 17 diagrammatically illustrates the connections of both the thermal switch and the light switch with a step-down transformer comprising a primary winding 140 and a secondary winding 141 and with a motor designated 142 and having a motor-operated control switch 143. Such transformer and motor are well known and need not be further described. Assuming that the transformer 140—141 is connected with a suitable source of alternating current, the bimetal 55 completes a circuit to the motor by way of either pair of the thermal switch contacts, dependent on the position of motor switch 143. Upon completion of a circuit to the motor the damper, or other means, for increasing the temperature about the thermostat, is actuated and the internal motor switch 143 opens the circuit and stops operation of the motor 142. As soon as a predetermined temperature has been reached, the motor goes through a similar cycle and returns the damper to its original position. The above operation of the thermostat and its control of the motor is usual and requires no further consideration. The light 103 is controlled by the contacts 84 and 88 which are closed by depressing the knob 23 and are biased into open position by the spring 87. The light is in effect on a separate circuit and may be operated at any time without affecting the circuit controlled by the bimetal.

It will be seen from the above description that the elements of the present structure are materially simplified as compared to prior structures which makes the device cheaper and easier to manufacture. The several elements are combined into a few relatively simple sub-assemblies which may be separately tested before final assembly, thus minimizing the production of defective devices. The several sub-assemblies are retained in their desired relation under spring tension which avoids strains in the finished product. The thermally responsive sub-assembly is simplified and is provided with adjustments for securing proper positioning relative to the other parts and for ease in calibration in the range of temperatures desired. The means for setting the thermal element act on such element in the direction of its flexing in operation which aids in maintaining accuracy of the movement of the thermal element within the desired range. The setting adjusting means converts rotary motion into rectilinear motion which allows the use of a long and more easily read scale. And the adjusting means serves the dual function of a switch for the light illuminating the temperature and adjustment indicating scale.

Although but one embodiment of the present invention has been illustrated and described, it will be apparent to those skilled in the art that various changes and modifications may be made therein without departing from the spirit of the invention or from the scope of the appended claims.

We claim:

1. The combination with a thermostatic control adjustably responsive to ambient temperature, and manual means for adjusting the control to respond to various ambient temperatures and for indicating the adjusted temperature on a scale, of electric light means for illuminating the scale, means included in said manual means for controlling current flow to the light means, and means biasing said manual means to a position in which said current controlling means are open, said manual means being actuated in opposition to said biasing means to close said current controlling means and illuminate said scale.

2. The combination with a thermostatic control adjustably responsive to ambient temperature, and manual means for adjusting the control to respond to various ambient temperatures and for indicating the adjusted temperature on a scale, of electric light means for illuminating the scale, switch means operated by said manual means to selectively control current flow to the light means, means biasing said manual means to a position in which said switch means is open, said manual means being actuated in opposition to said biasing means to close said switch means and being operative to adjust the control at all times.

3. A thermostatic control having a contact carried on a bimetal for movement with respect to a fixed contact and adapted to close an electrical circuit at a selected ambient temperature, means for varying the relationship of the contacts to select the desired ambient temperature, manually operated means for actuating said varying means, means for indicating the selected temperature, and electric light for illuminating the indicating means, switch means operable by said manual means for selectively controlling current flow to said light either independently of or simultaneously with actuation of the varying means, and means biasing said manual means to a position where the switch means is open and said light is inoperative.

4. In combination with a room thermostat having a bimetal flexing to control an electric circuit at a selected ambient temperature, pinion gear and rack means for adjusting the selected temperature and including means indicating the selected temperature, a normally inoperative electric light positioned to illuminate the indicating means, manually operated means for actuating said pinion and rack means and including switch means for selectively operating said light either independently of or simultaneously with actuation of the pinion and rack means, and means normally holding said switch means open.

5. In combination with a room thermostat having a bimetal flexing to control an electric circuit at a selected ambient temperature, rack means for adjusting the selected temperature and including means for indicating the selected temperature, a normally inoperative electric light positioned to illuminate the indicating means, a pinion gear mounted on a shaft for rotation to actuate said rack means, switch means associated with the shaft and controlling current flow to the light, said shaft being axially movable to close the switch means, said pinion engaging said rack means throughout said axial movement, and means biasing said shaft to normally retain said switch means open.

WILLIAM A. BIERMANN.
EDWARD R. RACK.

REFERENCES CITED

The following references are of record in the file of this patent:

UNITED STATES PATENTS

| Number | Name | Date |
| --- | --- | --- |
| 1,639,618 | Shapiro | Aug. 16, 1927 |
| 1,824,114 | Blakeslee | Sept. 22, 1931 |
| 2,041,566 | Mischler | May 19, 1936 |
| 2,124,089 | Stuerzl | July 19, 1938 |
| 2,162,296 | Chappell | June 13, 1939 |
| 2,244,347 | Rickmeyer | June 3, 1941 |
| 2,279,305 | Drake | Apr. 14, 1942 |
| 2,290,944 | Cunningham | July 28, 1942 |
| 2,332,471 | Rickmeyer | Oct. 19, 1943 |